Patented Apr. 17, 1923.

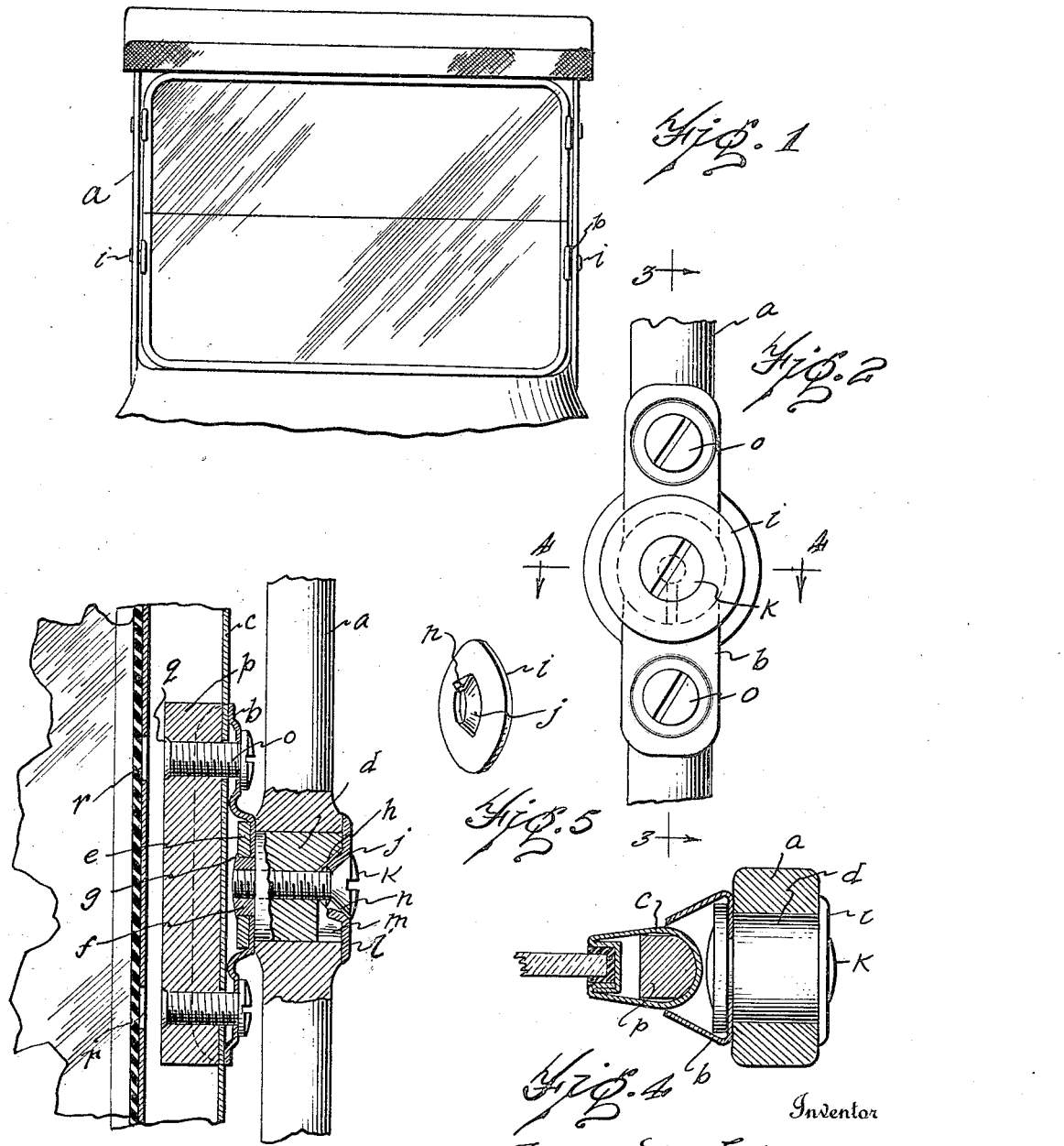

1,451,978

UNITED STATES PATENT OFFICE.

FRANK M. EDGAR AND THOMAS P. ARCHER, OF DETROIT, MICHIGAN, ASSIGNORS TO TERNSTEDT MANUFACTURING COMPANY, OF DETROIT, MICHIGAN, A CORPORATION OF MICHIGAN.

WINDSHIELD PIVOT.

Application filed April 17, 1922. Serial No. 553,936.

*To all whom it may concern:*

Be it known that we, FRANK M. EDGAR and THOMAS P. ARCHER, citizens of the United States, residing at Detroit, in the county of Wayne and State of Michigan, have invented certain new and useful Improvements in Windshield Pivots, of which the following is a specification.

This invention relates to windshield pivots, and has for its object a pivot that may be securely anchored on to the windshield frame and which may be easily disengaged from the stanchions. Windshield pivots which are anchored to the swinging panels and which have trunnion portions running through suitable bearings on the stanchions are of course old and common.

Efforts of the inventors must, therefore, be directed to providing pivots which secure better anchorage and which perform the old functions in a better or more efficient way. There is opportunity for large improvement in manufacturing efficiency and saving. It is to this end that the pivot here illustrated and claimed is largely directed. It is made up of parts that can be economically manufactured, either by stamping or by an automatical screw machine.

In the drawings:

Fig. 1 is a front elevation of the windshield.

Fig. 2 is the side elevation of the windshield pivot showing the parts assembled together but the stanchion omitted.

Fig. 3 is a section on line 3—3 of Fig. 2 and including the stanchion.

Fig. 4 is a section on the line 4—4 of Fig. 2 and including the stanchion.

Fig. 5 is a detail of the trunnion flange.

The stanchion is designated *a*. A clip *b* fits around the windshield frame or tube *c*; this clip is a single stamping. The trunnion *d* is secured to this clip *b* by using a washer *e*, placing the reduced inner end of the trunnion through the washer and upsetting this reduced end of the trunnion *d* to rivet the parts together. This practically locks the clip and washer into one unit, making, however, a very much solider bearing than is the case of the trunnion and clip that are stamped out of a single piece of metal. At the same time this construction is relatively cheaper from a manufacturing standpoint.

The trunnion *d* is a screw machine product which may be turned out in great quantities with great rapidity. The outer end of the trunnion is recessed as at *h* and the stamping or trunnion flange *i* can be fitted over the end of the trunnion, having pressed in a boss *j* at the center. This boss does not fit the recess tightly and the metal of the flange can be distorted, hence when the flange is secured to the trunnion by the screw *k* the metal of the flange can be slightly distorted. Accordingly the stress on the screw locks the screw from turning loose in the same way a spring washer does. Furthermore, the end of the trunnion is slotted as at *m* which forms a key-slot for the trunnion flange lug *n*. This prevents the flange from turning on the trunnion.

The clip *b* is secured to the windshield frame by screws *o* that screw into the plug on the inside of the tube. When the screws have been tightened the ends of the screws are upset as *q* by inserting a tool through the opening *r* in the bottom of the tube channel; this prevents the screws from coming out or loosening.

What we claim is:

1. In a windshield pivot, the combination of a clip in the form of a stamping that may be secured to the panel frame, and a trunnion in the form of a block having a reduced inner end which may be placed through an opening in the stamping and upset to secure the trunnion to the stamping.

2. In a windshield pivot, the combination of a clip in the form of a stamping, a trunnion in the form of a block having a reduced inner end can be placed through the clip, and a washer fitted over the reduced inner end, the said reduced inner end being upset over the washer to lock the washer and clip together as a unit.

3. In a windshield pivot, the combination of a trunnion in the form of a block having a recessed outer end, a trunnion flange constructed of distortable metal, and a screw securing the trunnion flange to the block and holding the trunnion flange in place by distorting the metal to lock and screw into its socket.

4. In a windshield pivot, the combination of a trunnion forming a block having a recessed end and a key-slot in said recess, a trunnion flange comprising a disk of distortable metal having a boss with a struck-out lug and a screw screwing into the trunnion block and having a head engaging in the socket formed by the boss struck out of the flange, whereby when the flange and screw are secured into the trunnion block the lug engages in the key-slot of the block to lock the parts against rotation.

5. In a windshield pivot, a trunnion provided with a key-slot in its end and having an axial tapped opening, a trunnion flange provided with a projected lug and a central opening, and a screw passing through said central opening and running into the tapped opening of the trunnion, whereby when the screw is tightened up the flange may be engaged against the trunnion block and locked in the keysocket against rotation.

6. In a windshield pivot, the combination of a slotted windshield tube, a plug secured therein, a trunnion, a trunnion clip secured to the trunnion exteriorly of the tube, and screws placed through the clip and screwing into the plug and having each its end upset through an opening in the bottom of the glass channel of the tube.

7. In combination, a slotted wind shield tube, and means for securing a pivot thereon comprising a trunnion, a clip secured thereon and arranged exteriorly of the tube, and fastening members passing through the clip and tube having their inner ends clinched within the tube.

In testimony whereof we affix our signatures.

FRANK M. EDGAR.
THOMAS P. ARCHER.